US010775503B2

(12) United States Patent
Wildi et al.

(10) Patent No.: US 10,775,503 B2
(45) Date of Patent: Sep. 15, 2020

(54) ABSOLUTE DISTANCE MEASUREMENT TO DYNAMIC TARGETS

(71) Applicant: LEICA GEOSYSTEMS AG, Heerbrugg (CH)

(72) Inventors: Konrad Wildi, Unterentfelden (CH); Thomas Lüthi, Aarau (CH); Hans-Ulrich Minder, Aarwangen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 385 days.

(21) Appl. No.: 15/951,032

(22) Filed: Apr. 11, 2018

(65) Prior Publication Data

US 2018/0292535 A1  Oct. 11, 2018

(30) Foreign Application Priority Data

Apr. 11, 2017 (EP) .................................... 17166125

(51) Int. Cl.
*G01C 3/08* (2006.01)
*G01S 17/34* (2020.01)
(Continued)

(52) U.S. Cl.
CPC ............ *G01S 17/34* (2020.01); *G01S 7/4052* (2013.01); *G01S 7/4865* (2013.01); *G01S 17/26* (2020.01);
(Continued)

(58) Field of Classification Search
CPC ...... G01S 7/4052; G01S 7/4865; G01S 17/36; G01S 17/34; G01S 17/58; G01S 17/32; G01S 17/26
(Continued)

(56) References Cited

U.S. PATENT DOCUMENTS

| 4,759,623 A | 7/1988 | Meier |
| 5,764,360 A | 6/1998 | Meier |

(Continued)

FOREIGN PATENT DOCUMENTS

| EP | 0 205 406 B1 | 4/1991 |
| EP | 0 807 262 B1 | 12/2001 |
| EP | 2 653 884 A1 | 10/2013 |

OTHER PUBLICATIONS

European Search Report closing date Jan. 28, 2018 as received in Application No. 17166125.9.

(Continued)

*Primary Examiner* — Mark Hellner
(74) *Attorney, Agent, or Firm* — Maschoff Brennan

(57) ABSTRACT

A measuring method and a distance measuring device for determining an absolute distance to a target moving at a radial movement velocity with respect to the distance measuring device, wherein a modulated transmission radiation is emitted to the target and a measurement signal is detected, such that information regarding the absolute distance to the target is attached to the measurement signal by means of at least one reference point of a frequency-dependent signal profile of the measurement signal, on the basis of a modulation phase of the reception radiation with respect to a set fundamental modulation, wherein for a set fundamental modulation frequency the deviation of said frequency value with respect to a reference point, in particular a minimum point, of the signal profile of the measurement signal is derived, namely the frequency offset and the offset direction with respect to the reference point.

12 Claims, 3 Drawing Sheets

(51) Int. Cl.

| | |
|---|---|
| *G01S 17/58* | (2006.01) |
| *G01S 7/4865* | (2020.01) |
| *G01S 7/40* | (2006.01) |
| *G01S 17/36* | (2006.01) |
| *G01S 17/32* | (2020.01) |
| *G01S 17/26* | (2020.01) |

(52) U.S. Cl.
CPC .............. *G01S 17/32* (2013.01); *G01S 17/36* (2013.01); *G01S 17/58* (2013.01)

(58) Field of Classification Search
USPC ....................................................... 356/5.09
See application file for complete search history.

(56) References Cited

U.S. PATENT DOCUMENTS

| | | | |
|---|---|---|---|
| 2010/0315619 A1* | 12/2010 | Luethi | .................... G01S 7/499 356/5.09 |
| 2013/0148103 A1* | 6/2013 | Halmos | ................... G01S 17/50 356/5.09 |
| 2014/0376001 A1 | 12/2014 | Swanson | |

OTHER PUBLICATIONS

Loser, R., "Weiterentwicklung eines absoluten, hochpräzisen und trackingfähigen Distanzmessers für industrielle Anwendungen," Diss. Eth Nr. 14099, Fürstenfeldbruck, Deutschland, pp. 1-114 (Sep. 23, 1954).

* cited by examiner

ABSOLUTE DISTANCE MEASUREMENT TO DYNAMIC TARGETS

CROSS-REFERENCE TO RELATED APPLICATIONS

This application claims priority to European Patent Application No. 17166125.9 filed on Apr. 11, 2017, which is incorporated herein by reference.

FIELD OF THE INVENTION

The invention relates to a measuring method and a distance measuring device for determining an absolute distance to a target moving at a radial movement velocity with respect to the distance measuring device.

BACKGROUND

For the high-resolution measurement of distances, by way of example—nowadays in an increasingly standardized manner—laser interferometers are used. In this case, a collimated laser beam passes from a measuring instrument to a reflective target. The transmitted beam is superimposed on the beam which is reflected by the target and received in the measuring instrument. In the event of a change in distance, the intensity of the superimposed beams changes in accordance with the interference of the two beams. On the basis of the wavelength of the laser light and a number of detected intensity changes counted by means of a counter, it is thus possible to determine a relative distance change with respect to the target. Proceeding from a known reference value, that is to say an absolute distance in a starting position, it is thus also possible to ascertain an absolute distance from other positions.

However, such a method for determining a relative distance necessitates that the beam not be interrupted between measuring instrument and target. If this occurs, then distance changes are no longer detected during the interruption, and the absolute distance between measuring instrument and target is no longer known and must therefore be determined or calibrated anew using other means.

Various methods are known for measuring absolute distances, for example various variants based on the principle of the so-called gearwheel method according to Fizeau. In this case, originally a light beam was interrupted periodically by a gearwheel, then transmitted to a reflector and finally interrupted periodically a second time at the gearwheel. From the rotational speed of the gearwheel in the case of an extinction of the returning light beam, it is possible to determine the propagation time thereof by comparison with the propagation time of a gearwheel tooth up to the closest tooth gap.

Nowadays, instead of the gearwheel, by way of example, an electro-optical crystal is used as a modulator. In this case, the measurement beam is no longer interrupted periodically, but rather is modulated by the modulator. During the modulation, by way of example, a polarization and/or the intensity and/or the frequency of the transmission radiation are/is modulated, wherein the absolute distance to the target can be derived on the basis of the modulation phase of the returning transmission radiation.

By way of example, a measurement signal is detected by means of modulation/demodulation of at least part of the modulated transmission radiation and part of the transmission radiation returning from the target in such a way that the light intensity of the measurement signal changes periodically as a function of the reflector distance and the modulation frequency. By way of example, if the modulation frequency is increased continuously over a defined frequency range, then equidistant minima with the spacing of the wavelengths of the modulated frequency form during a synchronous recording using an intensity detector. In this case, the arising of the individual minima is based on the fact that at the individual minima at every moment there are precisely a whole number of modulation wavelengths at the doubled measurement distance between modulator and target. The measurement distance is thus essentially given by how far apart from one another two minima are in terms of frequency.

By way of example, if one minimum is at a first frequency, then the doubled measurement distance contains a whole number of wavelengths of the first frequency. If the modulation frequency is then increased continuously, at the nearest neighboring minimum of a second frequency the doubled measurement distance contains exactly one more wavelength of the second frequency. Since the same distance is measured at both frequencies, the absolute distance to the target can then thus be ascertained by measurement (location of the minimum in terms of frequency) of at least two minima.

For achieving high measurement accuracies, for example accuracies of less than 100 µm, in particular less than 1 µm, the ascertainment of the individual minima is made more difficult by atmospheric turbulences and variations of the refractive index in the measurement path. However, the atmospheric fluctuations can be compensated for by, for example, correlation with a reference signal, for example using a wobble generator for an additional frequency modulation (wobble) of the (fundamental) modulation frequency and using a lock-in amplifier for the detection of the modulated signal.

In this case, measuring instruments from the prior art use for example the sign of the correlation for the determination of the offset direction with respect to the minimum, that is to say for the determination of whether a currently set fundamental modulation frequency is below or above the frequency of the minimum point. It is true that a vague distance (offset) in terms of frequency with respect to the minimum point can furthermore also be predicted as a trend by way of the value of the correlation. However, an accurate prediction of the offset with respect to the minimum point is made impossible in practice by various factors, for example the type of reflector used, the contamination and tilting of the reflector, the targeting accuracy, the distance to the target, the laser power, or the air damping.

In the static case, that is to say for a target at a fixed distance, the minimum point can be determined for example by means of an iterative approximation—with the aid of the offset direction—and the fact that the offset with respect to the minimum point does not emerge directly from the correlation is normally of no importance. The distance measurement simply takes somewhat longer.

For signal amplification and/or elimination of measurement noise, a plurality of measurement values are typically filtered, for example by integration or averaging.

In contrast to the measurement of relative distances (for example by means of interferometry), a measurement of absolute distances according to the above method, owing to the measurement principle used, for example depending on the measurement distance (signal strength) and the accuracy (atmospheric turbulences), requires a specific minimum measurement duration during which the distance is not permitted to change. This limits for example the application of the method for a measurement and tracking of dynamic targets (targets at a radial movement velocity in relation to the measuring instrument). Therefore, in distance measuring instruments, absolute distance measuring methods, for example according to the Fizeau principle, are often combined with relative distance measuring methods, since the latter can have comparatively high measurement dynamic ranges, for example methods based on relative interferometry measurements or based on the pulse time-of-flight method.

SUMMARY

Therefore, one object of some embodiments of the invention is to provide an improved distance measuring method for the determination of absolute distance values for movable targets.

One specific object of some embodiments of the invention, moreover, is to provide a distance measuring method in accordance with the Fizeau principle having a high measurement dynamic range and a high distance measurement accuracy.

These objects are achieved by the realization of the characterizing features of the independent claims. Features which develop the invention in an alternative or advantageous manner can be gathered from the dependent patent claims.

Some embodiments of the invention relates to a method for determining a distance to a retroreflective target, comprising generating a transmission radiation and modulating the transmission radiation. In this case, for the modulation, a fundamental modulation of the transmission radiation with a fundamental modulation frequency is provided by means of modulation means in the optical beam path of the transmission radiation, for example by means of a modulator based on the electro-optical effect for modulating the polarization of the transmission radiation. Alternatively, the fundamental modulation can constitute for example a modulation of the intensity and/or the frequency of the transmission radiation. Furthermore, a wobble of the fundamental modulation frequency is provided by means of a wobble generator.

In particular, the frequency of the wobble is for example higher than the frequency of the atmospheric fluctuations of the optical measurement path to the target, in particular higher than 1 kHz.

The modulated (and wobbled) transmission radiation is emitted to the target, and a measurement signal is detected, on the basis of part of the modulated transmission radiation returning from the target, referred to hereinafter as reception radiation. In this case, detecting the measurement signal is carried out in such a way that information regarding the absolute distance to the target is attached to the measurement signal by means of at least one reference point, for example a minimum point, of a frequency-dependent signal profile of the measurement signal, on the basis of a modulation phase of the reception radiation with respect to a set fundamental modulation.

By way of example, that means that the measurement signal is emitted in such a way and detected in such a way that in the event of a variation of the fundamental modulation frequency over a defined frequency range, at least one reference point, typically at least two reference points, would arise, for example characterized by the fact that at the reference point at every moment there are precisely a whole number of modulation wavelengths at the doubled measurement distance between modulator and target.

According to some embodiments of the present invention, the wobble is furthermore provided in such a way that the wobble represents a continuously rising or continuously falling frequency profile at least in sections, in particular wherein the wobble is provided as a triangular signal, a sawtooth signal, or a sinusoidal signal. According to some embodiments of the invention, the detected measurement signal is Fourier-transformed, and the distance is determined on the basis of the Fourier-transformed measurement signal, wherein for a set fundamental modulation frequency the deviation of the frequency value of the fundamental modulation frequency with respect to a reference point, in particular a minimum point, of the signal profile of the measurement signal is derived, wherein the deviation here indicates the frequency offset and the offset direction with respect to the reference point.

By way of example, since the relatively close vicinity of the minimum can be described as a parabola, the combination according to the invention of the described wobble—provided as a continuously rising or continuously falling frequency profile in sections—and the Fourier transformation of the measurement signal enables a direct determination of the deviation with respect to the reference point, for example on the basis of an individual set frequency value for the fundamental modulation frequency. The determination of the deviation with respect to the reference point, e.g. a minimum, is independent of the shape of the parabola and depends only on given calculable variables.

As a result of the direct determination according to the invention of the deviation of a set frequency value for the fundamental modulation frequency with respect to a reference point of the signal profile of the measurement signal, a high measurement dynamic range is achieved and a rapid determination of the absolute distance even to movable targets is thus made possible, for example targets at a radial movement velocity of up to plus/minus 6 m/sec. with respect to the origin of the transmission radiation.

In accordance with one embodiment, the wobble is provided as a periodic signal, in particular wherein the measurement signal is sampled for the determination of the deviation in such a way that the sampling rate of the measurement signal is a power of two of the wobble frequency, as a result of which no smoothing window is necessary for example for the Fourier transformation of the sampled measurement signal.

In a further embodiment, the deviation is determined, by way of example, on the basis of the amplitude and the imaginary part of the first harmonic of the Fourier decomposition of the measurement signal, the amplitude of the second harmonic of the Fourier decomposition of the measurement signal, and the excursion of the wobble.

By way of example, in accordance with a further embodiment of the invention, the ascertainment of the reference point can comprise a sweep of the fundamental modulation frequency over a defined frequency range, in particular wherein the frequency range is defined in such a way that the signal profile of the measurement signal over the frequency range, on the basis of a defined distance measurement range, comprises at least two reference points for a distance to be determined within the distance measurement range.

Some embodiments of the invention furthermore relate to a method for determining a distance to a retroreflective target, comprising generating a transmission radiation and modulating the transmission radiation, wherein a fundamental modulation of the transmission radiation with a fundamental modulation frequency is provided by a modulation means in the optical beam path of the transmission radiation.

In this case, the method comprises emitting the modulated transmission radiation to the target, and detecting a measurement signal on the basis of part of the modulated transmission radiation returning from the target, referred to hereinafter as reception radiation, wherein detecting the measurement signal is carried out in such a way that information regarding the absolute distance to the target is attached to the measurement signal by means of at least one reference point of a frequency-dependent signal profile of the measurement signal, on the basis of a modulation phase of the reception radiation with respect to a set fundamental modulation (a set frequency value for the fundamental modulation frequency).

According to some embodiments of the present invention, the distance to the target is determined continuously, on the basis of a measurement process comprising defined steps corresponding to the temporal order below: initially determining an initial distance to the target and continuously determining a respective current distance to the target on the basis of a setable fundamental modulation frequency.

In this case, the initial distance determination is based on an identification of a first and a second reference point of the signal profile of the measurement signal, on the basis of a sweep of the fundamental modulation frequency over a defined frequency range, a tracking of the first and second reference points, and deriving the initial distance on the basis of the identified first and second reference points.

The sweep can be carried out for example in such a way that the frequency of the fundamental modulation is increased continuously or in defined frequency steps, wherein for example equidistant minima with the spacing of the wavelengths of the modulated frequency form during a synchronized recording using an intensity detector, on the basis of the fact that at the individual minima at every moment there are precisely a whole number of modulation wavelengths at the doubled measurement distance between modulator and target.

On the basis of the initial distance determination, the subsequent process of continuously determining a respective current distance to the target is based on a tracking of the first reference point as long as the latter lies within a tolerance range defined within the defined frequency range, and a continuous derivation of the deviation of the frequency value of a set fundamental modulation frequency with respect to the first reference point, wherein the continuous derivation of the deviation is based on a wobble of the fundamental modulation frequency, said wobble being provided by a wobble generator. In this case, the wobble is provided in such a way that it represents a continuously rising or continuously falling frequency profile at least in sections, in particular wherein the wobble is provided as a triangular signal, a sawtooth signal, or a sinusoidal signal. The detected measurement signal is Fourier-transformed, and the determination of the current distance is carried out on the basis of the Fourier-transformed measurement signal, such that for a set fundamental modulation frequency the deviation of the frequency value of the fundamental modulation frequency with respect to the first reference point of the signal profile of the measurement signal is derived, namely the frequency offset and the offset direction with respect to the reference point.

Furthermore, by way of example, in one embodiment, in the case where the first reference point leaves the tolerance range, on the basis of the last ascertainment of the deviation with respect to the first reference point within the tolerance range a further reference point within the tolerance range is selected, and the process of continuously determining the respective current distance to the target is continued, on the basis of a tracking of the further reference point as long as the latter lies within the tolerance range and a continuous derivation of the deviation of the frequency value of a set fundamental modulation frequency with respect to the further reference point.

In accordance with a further embodiment, the setable fundamental modulation frequency is adapted in the context of the measurement process, on the basis of individually derived deviations or a series of derived deviations of frequency values of previously set fundamental modulation frequencies with respect to the first reference point and/or individually derived deviations or a series of derived deviations of frequency values of previously set fundamental modulation frequencies with respect to the further reference point.

Some embodiments of the invention furthermore relates to a distance measurement device for determining a distance to a retroreflective target, comprising a radiation source for generating a transmission radiation, modulation means in the optical beam path of the transmission radiation, which are configured for providing a fundamental modulation of the transmission radiation with a fundamental modulation frequency, a wobble generator, which is configured for providing a wobble of the fundamental modulation frequency, a transmission path for emitting part of the modulated transmission radiation to the target, a reception path comprising a receiver configured for detecting a measurement signal on the basis of part of the modulated transmission radiation returning from the target, referred to hereinafter as reception radiation, and a computing unit configured for determining the distance as an absolute distance. In this case, the modulation can be carried out in such a way that a polarization, the intensity, and/or the frequency of the transmission radiation is modulated. Furthermore, the distance measuring device is configured in such a way that emitting the part of the modulated transmission radiation and detecting the measurement signal are carried out in such a way that information regarding the absolute distance to the target is attached to the measurement signal by means of at least one reference point of a frequency-dependent signal profile of the measurement signal, on the basis of a modulation phase of the reception radiation with respect to a set fundamental modulation.

In particular, the wobble is provided by the wobble generator for example with a frequency higher than the frequency of the atmospheric fluctuations of the optical measurement path to the target, in particular higher than 1 kHz.

According to one embodiment of the present invention, the wobble generator is configured for providing the wobble as a wobble having a continuously rising or continuously falling frequency profile at least in sections, in particular for providing the wobble as a triangular signal, a sawtooth signal, or a sinusoidal signal, the computing unit is configured to transform the detected measurement signal by means of Fourier transformation, and the computing unit is configured to carry out the determination of the distance on the basis of the Fourier-transformed measurement signal. In this case, the computing unit, for the purpose of determining the distance for a set fundamental modulation frequency, derives the deviation of the frequency value of the fundamental modulation frequency with respect to a reference point, in particular a minimum point, of the signal profile of the measurement signal, namely the frequency offset and the offset direction with respect to the reference point.

In one embodiment, the wobble generator is configured to provide the wobble as a periodic signal, for example as a time-discretely generated signal, in particular with a number of values per period that is given as a power of two, in particular wherein the computing unit is configured in such a way that the measurement signal is sampled for the determination of the deviation in such a way that the sampling rate of the measurement signal is a power of two of the wobble frequency, e.g. 32 times the wobble frequency.

A further embodiment is characterized in that the computing unit is configured in such a way that the deviation is determined on the basis of the amplitude and the imaginary part of the first harmonic of the Fourier decomposition of the measurement signal, the amplitude of the second harmonic of the Fourier decomposition of the measurement signal, and the excursion of the wobble.

In accordance with a further embodiment, the distance measuring device can furthermore be configured to carry out the ascertainment of the reference point by means of a sweep of the fundamental modulation frequency over a defined frequency range, in particular wherein the frequency range is defined in such a way that the signal profile of the measurement signal over the frequency range, on the basis of a defined distance measurement range, comprises at least two reference points for a distance to be determined within the distance measurement range.

Some embodiments the invention furthermore relates to a distance measuring device for determining a distance to a retroreflective target, comprising a radiation source for generating a transmission radiation, modulation means in the optical beam path of the transmission radiation, which are configured for providing a fundamental modulation of the transmission radiation with a fundamental modulation frequency, a transmission path for emitting part of the modulated transmission radiation to the target, a reception path comprising a receiver configured for detecting a measurement signal on the basis of part of the modulated transmission radiation returning from the target, referred to hereinafter as reception radiation, and a computing unit configured for determining the distance as an absolute distance. In this case, the distance measuring device is configured in such a way that emitting the part of the modulated transmission radiation and detecting the measurement signal are carried out in such a way that information regarding the absolute distance to the target is attached to the measurement signal by means of at least one reference point of a frequency-dependent signal profile of the measurement signal, on the basis of a modulation phase of the reception radiation with respect to a set fundamental modulation.

According to one embodiment of the present invention, the computing unit is configured for carrying out a fully automated preprogrammed measurement process for continuously detecting the measurement signal and continuously determining the distance to the target (8), wherein the measurement process comprises defined steps corresponding to the temporal order below: initially determining an initial distance to the target and continuously determining a respective current distance to the target on the basis of a setable fundamental modulation frequency.

In this case, the process of determining the initial distance to the target is based on an identification of a first and a second reference point of the signal profile of the measurement signal, on the basis of a sweep of the fundamental modulation frequency over a defined frequency range, a tracking of the first and second reference points, and deriving the initial distance on the basis of the identified first and second reference points.

Subsequently, the process of continuously determining a respective current distance to the target is based on a setable fundamental modulation frequency and a tracking of the first reference point as long as the latter lies within a tolerance range defined within the defined frequency range, and a continuous derivation of the deviation of the frequency value of a set fundamental modulation frequency with respect to the first reference point. In this case, the continuous derivation of the deviation is based on a wobble of the fundamental modulation frequency, said wobble being provided by a wobble generator, wherein the wobble generator is configured for providing the wobble as a wobble having a continuously rising or continuously falling frequency profile at least in sections, in particular for providing the wobble as a triangular signal, a sawtooth signal, or a sinusoidal signal. Furthermore, the computing unit is configured to transform the detected measurement signal by means of fourier transformation, and the computing unit is configured to carry out the determination of the distance on the basis of the Fourier-transformed measurement signal, wherein the computing unit, for the purpose of determining the distance for a set fundamental modulation frequency, derives the deviation of the frequency value of the fundamental modulation frequency with respect to a reference point, in particular a minimum point, of the signal profile of the measurement signal, namely the frequency offset and the offset direction with respect to the reference point.

In one embodiment, the distance measuring device is configured in such a way that the measurement process comprises a further step such that in the case where the first reference point leaves the tolerance range, on the basis of the last ascertainment of the deviation with respect to the first reference point within the tolerance range, a further reference point within the tolerance range is selected, and the process of continuously determining the respective current distance to the target is continued, on the basis of a tracking of the further reference point as long as the latter lies within the tolerance range and a continuous derivation of the deviation of the frequency value of a set fundamental modulation frequency with respect to the further reference point.

In accordance with a further embodiment, the setable fundamental modulation frequency is additionally adapted in the context of the measurement process, on the basis of individually derived deviations or a series of derived deviations of frequency values of previously set fundamental modulation frequencies with respect to the first reference point and/or individually derived deviations or a series of derived deviations of frequency values of previously set fundamental modulation frequencies with respect to the further reference point.

The distance measuring method according to some embodiments of the invention and the distance measuring device according to some embodiments of the invention are described in greater detail below purely by way of example on the basis of exemplary embodiments illustrated schematically in the drawings. Identical elements are identified by identical reference signs in the figures. The embodiments described are generally not illustrated in a manner true to scale, nor should they be understood as a restriction.

DETAILED DESCRIPTION

Figure 1:
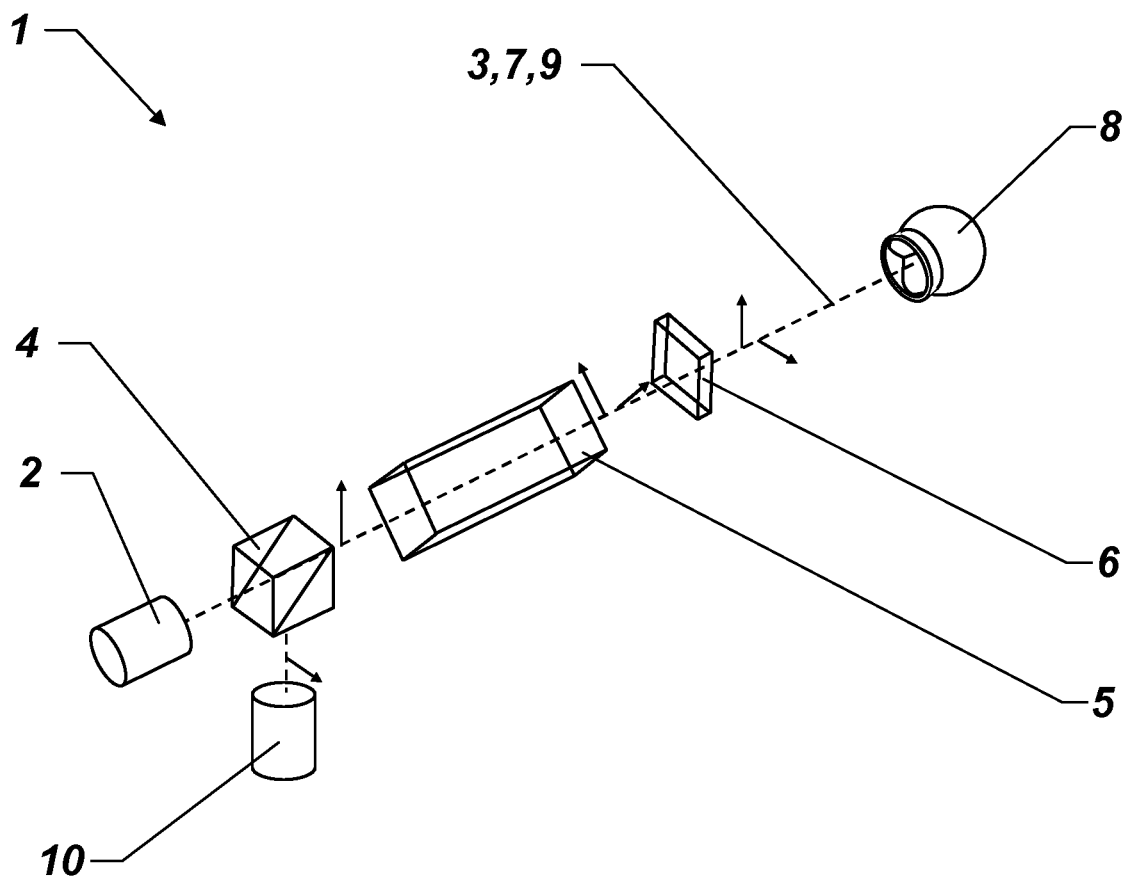
FIG. 1: shows a schematic illustration of an absolute distance measuring device in accordance with the Fizeau principle on the basis of a modulation of the polarization of the transmission radiation.

FIG. 1 shows a structure of a Fizeau distance measuring device 1, here on the basis of a modulation of the polarization of the transmission radiation. However, further embodiments, for example on the basis of a modulation of the intensity and/or the frequency of the transmission radiation, are sufficiently known in the prior art, wherein the absolute distance to the target can be derived on the basis of the modulation phase of the returning transmission radiation in all of the embodiments.

In the example shown, the Fizeau distance measuring device 1 comprises a radiation source 2 for generating a measurement beam 3, which is emitted as a transmission beam 7 to a retroreflective target 8 via a polarizing beam splitter 4, a modulator 5, a retarder or a retarder plate 6, here for example a lambda/4 plate. The distance to the target may be for example from less than one meter to hundreds of meters, possibly even a few kilometers.

The modulator 5 used can be for example an electro-optical modulator, e.g. based on a Pockels cell or an FLC (Ferro-electric Liquid Crystal), an acousto-optical modulator, or else for example a modulator based on an integrated optical unit, for example based on a Mach-Zehnder arrangement.

At least part of the transmission radiation 7 is reflected back from the target 8 as reception radiation 9, wherein a measurement signal is detected as a function of the modulation frequency of the modulator 5 by means of a detector 10.

In the example shown, the reception radiation 9 is passed in turn through the retarder plate 6, the modulator 5 and the polarizing beam splitter 4 onto a detector 10. The modulator 5 here thus modulates the polarization of the outgoing and also the returning measurement light. For this purpose, it comprises for example a device for driving the modulator 5 with a high-frequency modulation frequency. The retarder plate 6, here a lambda/4 plate, thus generates circularly polarized light from linearly polarized light, and, after passage twice, once again linearly polarized light, but having a polarization direction rotated by 90°, for example in the case of a modulation crystal having interchanged axes of the modulation in the modulation crystal.

The detector 10 measures the intensity of the returning light. An evaluation unit (not shown) processes an output signal of said detector 10, controls the modulation frequency of the modulator 5, for example for iteratively determining a minimum of the detector signal, and carries out the distance determination according to the Fizeau method. Further generally known elements of such a distance measuring device such as beam shaping optical units, filters, polarizers, mirrors, etc. may be present, but are not depicted for the sake of clarity.

Figure 2:
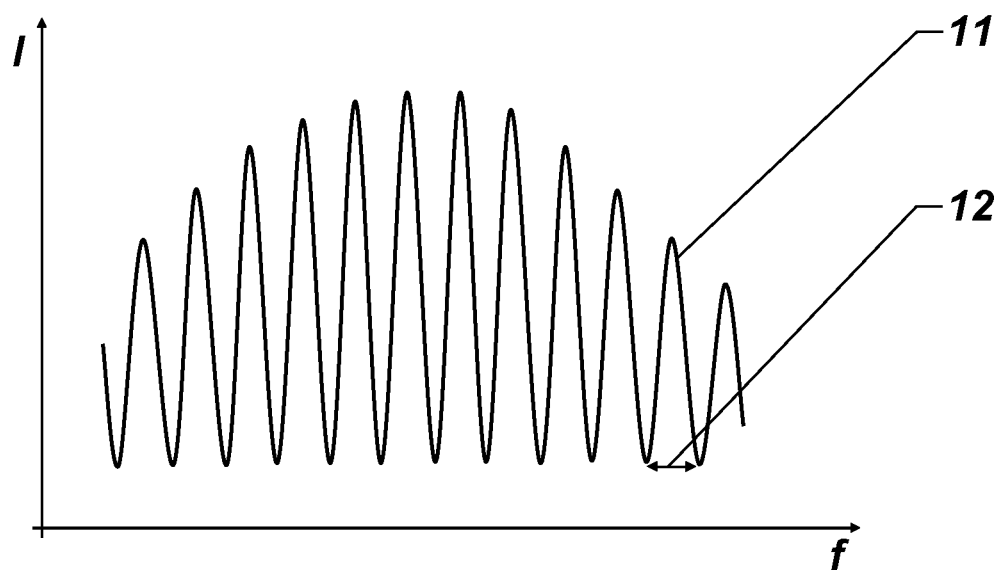
FIG. 2: shows a signal profile of a measurement signal of a distance measurement according to the Fizeau principle.

FIG. 2 shows a signal profile 11 of a measurement signal of a distance measurement according to the Fizeau principle as a function of the modulation frequency of the modulator 5 (see FIG. 1), for example on the basis of a distance measuring device 1 in accordance with FIG. 1.

Independently of the type of modulation (polarization, intensity, phase), the signal profile 11 of a measurement signal of a Fizeau distance measuring device has the general property that the intensity I of the measurement signal changes periodically as a function of the reflector distance and the modulation frequency f. By way of example, if the modulation frequency f is increased continuously over a defined frequency range, then equidistant minima with the spacing 12 of the wavelengths of the modulated frequency form during a synchronous recording using a photodetector.

By way of example, if one minimum is at a first frequency, then the doubled measurement distance contains a whole number of wavelengths of the first frequency, wherein, therefore, with the distance to the target 8 being kept constant, the absolute distance to the target 8 can then be ascertained by measurement (location of the minimum in terms of frequency) of at least two minima.

For an accurate determination of the minima, a wobble is typically applied to the modulation frequency f, for example a sinusoidal frequency modulation. Thus, the first derivative can then be formed for example from the detected measurement signal, wherein a zero crossing of the measurement signal (with wobble) takes place at the minimum point of the signal profile 11 without wobble. Such a zero crossing is often easier to detect than a minimum.

In this case, measuring instruments from the prior art use for example the sign of the correlation from the detected measurement signal with the wobble signal for the determination of the offset direction with respect to the minimum. It is true that a vague distance (offset) in terms of frequency with respect to the minimum point can furthermore also be predicted as a trend by way of the value of the correlation. However, an accurate prediction of the offset with respect to the minimum point is made impossible in practice by various factors, for example the type of reflector used, the contamination and tilting of the reflector, the targeting accuracy, the distance to the target, the laser power, or the air damping.

Therefore, in the prior art, the minimum points of the signal profile 11 of the measurement signal are typically determined iteratively by variation of the (fundamental) modulation frequency of the modulator 5. In this case, by way of example, each step uses an adapted frequency step size that leads close to the zero crossing sought as rapidly as possible. This produces a temporal sampling sequence of modulation frequencies $f_n, f_{n+1}, f_{n+2}, \ldots$, which leads to the zero crossing frequency or minimum frequency.

Since this iterative approximation requires a certain time, for signal amplification and/or elimination of measurement noise a plurality of measurement values are typically filtered, for example by integration or averaging, in accordance with the prior art the distance is not permitted to change during this time since the iteration generally could not follow the distance change rapidly enough.

This limits for example the application of the method for a measurement and tracking of dynamic targets (targets at a radial movement velocity in relation to the measuring instrument).

Figure 3:
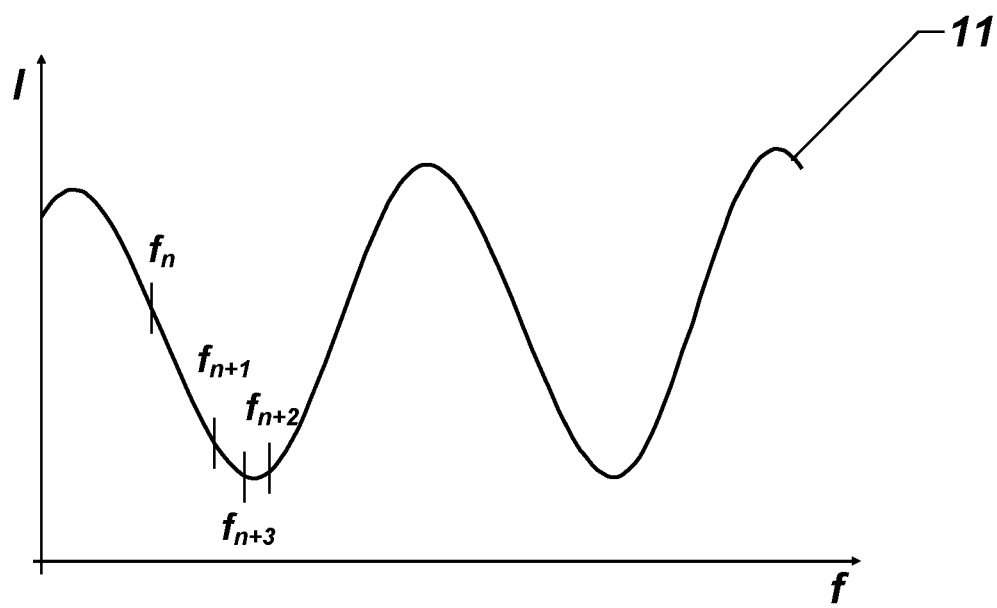
FIG. 3: shows an iterative determination of a minimum point of the measurement signal according to the prior art.
Figure 4:
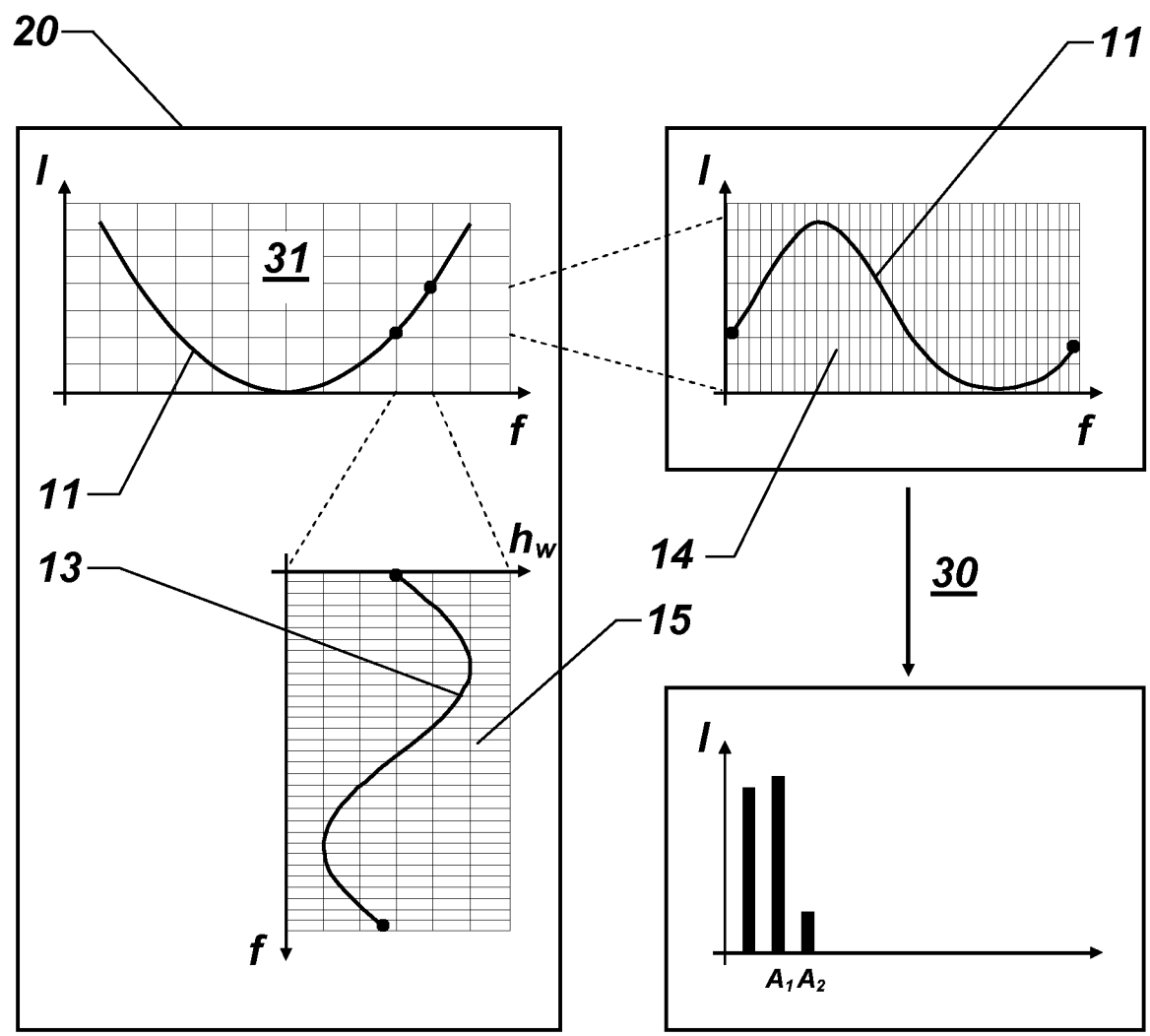
FIG. 4: shows an ascertainment of the minimum point according to the invention, on the basis of a wobble and a Fourier transformation of the detected measurement signal.

FIG. 4 shows an ascertainment according to the invention of a reference point of the signal profile 11 (see FIG. 3) of the measurement signal, here in turn a minimum point, by means of a modulation 20 of the transmission radiation on the basis of a fundamental modulation of the transmission radiation, generated by modulation means in the optical beam path of the transmission radiation 7 (FIG. 1), and a wobble 13, generated by a wobble generator. According to the invention, the reference point of the signal profile 11 is ascertained on the basis of the signal profile of the detected (wobbled) measurement signal, and the Fourier transformation 30 thereof.

In this case, the wobble signal 13 is provided in such a way that the wobble 13 represents a continuously rising or continuously falling frequency profile at least in sections, in particular wherein the wobble 13 is provided as a triangular signal, a sawtooth signal, or a sinusoidal signal.

In particular, the frequency of the wobble 13 is set for example in such a way that it is higher than the frequency of the atmospheric fluctuations of the optical measurement path to the target, in particular higher than 1 kHz, wherein the excursion $h_w$ of the wobble is typically much smaller than the frequency spacing between two neighboring reference points of the signal profile 11 of the measurement signal.

According to the invention, the detected (wobbled) measurement signal is Fourier-transformed 30, wherein the determination of the distance, for example by means of the determination of the deviation of the frequency value of a set fundamental modulation frequency with respect to a reference point, is carried out on the basis of the Fourier-transformed measurement signal 30.

In the example shown, the wobble signal 13 is a sinusoidal signal, wherein the minimum vicinity 31 of the signal profile 11 can be described for example approximately as a parabola. Other combinations of minimum simulations and wobble signals are also possible, for example a minimum configured as (1−cos(x)) or a wobble signal based on a triangular or sawtooth signal, but a parabola model for the minimum and the sine as wobble source leads to the simplest mathematical description.

Since the relatively close vicinity of the minimum can be described as a parabola, upon the Fourier transformation 30 of the measurement signal, on the basis of the transmission radiation that is modulated and wobbled by means of a sine, the properties arise that, on the basis of a set fundamental modulation frequency of the modulation means, the determination of the deviation of the frequency value of the fundamental modulation frequency with respect to the minimum is independent of the shape of the parabola and depends only on predefined calculable variables. The shape of the parabola is thus unimportant and the determination of the deviation is independent of the returning radiation intensity, i.e. independent of the type of reflector used, a reflector tilting, a reflector displacement, or a reflector contamination.

In the example described, the deviation, that is to say the offset magnitude and the offset direction, can be determined for example directly by way of the excursion H of the wobble signal, and also by way of the first harmonic $A_1$ and the second harmonic $A_2$ of the Fourier decomposition 30 of the measurement signal. The offset magnitude D can be determined for example by the formula $D=A_1/A_2 \cdot H \cdot K$, wherein K is a calibration parameter, wherein the offset direction can be derived for example by way of the imaginary part of the first harmonic $A_1$.

For the exemplary implementation, it is additionally advantageous, for example, if the signal profile of the measurement signal 11 is sampled at a sampling rate 14 that is a power of two of the wobble frequency, wherein in the figure the wobble is provided for example as a time-discrete signal and the clock rate of the wobble 15 is precisely equal to the sampling 14 of the measurement signal 11.

As a result of the direct determination according to the invention of the deviation of the frequency value for a set fundamental modulation frequency with respect to a reference point of the signal profile 11 of the measurement signal, in particular a minimum point, a high measurement dynamic range is achieved and a rapid determination of the absolute distance even to movable targets is thus made possible, in particular targets at a radial movement velocity of up to plus/minus 6 m/sec. with respect to the origin of the transmission radiation.

An initial absolute distance determination in accordance with the Fizeau method is based for example on an identification and, in particular for movable targets, a tracking of at least a first and a second reference point, e.g. two neighboring minima, of the signal profile of the measurement signal. The identification of the reference points can be carried out for example by a frequency sweep of the modulation means over a defined frequency range and/or by means of defined adaptation of a sequence of frequency steps.

For a continuous determination of the distance to an initially detected target, however, as a result of the direct determination according to the invention of the deviation of the frequency value of a set fundamental modulation frequency with respect to a reference point, it is sufficient, on the basis of the equidistant spacings 12 (FIG. 2) of the minima of the signal profile 11, if at least one reference point is tracked and used for the derivation of the distance.

By way of example, in the case where a first reference point currently being used for the distance derivation leaves the frequency detection range chosen for the continuous distance measurement, it is possible to select a new suitable reference point for the further distance derivation.

Furthermore, the set fundamental modulation frequency can also be adapted in the context of the measuring process, for example on the basis of individually derived deviations or a series of derived deviations of frequency values of previously set fundamental modulation frequencies with respect to a reference point.

It goes without saying that these figures illustrated merely schematically illustrate possible exemplary embodiments. The various approaches can likewise be combined with one another and also with methods from the prior art.

What is claimed is:

1. A method for determining a distance to a retroreflective target, the method comprising:
    generating a transmission radiation;
    modulating the transmission radiation, wherein:
        a fundamental modulation of the transmission radiation with a fundamental modulation frequency is provided by a modulation means in the optical beam path of the transmission radiation, and
        a wobble of the fundamental modulation frequency is provided by a wobble generator;
    emitting the modulated transmission radiation to the target; and
    detecting a measurement signal on the basis of reception radiation comprising part of the modulated transmission radiation returning from the target, wherein detecting the measurement signal is carried out such that information regarding the absolute distance to the target is attached to the measurement signal by means of at least one reference point of a frequency-dependent signal profile of the measurement signal, on the basis of a modulation phase of the reception radiation with respect to a set fundamental modulation, wherein:

the wobble represents a continuously rising or continuously falling frequency profile at least in sections, the detected measurement signal is Fourier-transformed, and the distance is determined on the basis of the Fourier-transformed measurement signal, wherein for a set fundamental modulation frequency the deviation of the frequency value of the fundamental modulation frequency with respect to a reference point of the signal profile of the measurement signal is derived.

2. The method according to claim 1, wherein the wobble is provided as a periodic signal.

3. The method according to claim 1, wherein the deviation is determined on the basis of:

the amplitude and the imaginary part of the first harmonic of the Fourier decomposition of the measurement signal, the amplitude of the second harmonic of the Fourier decomposition of the measurement signal, and the excursion of the wobble.

4. The method according to claim 1, wherein the reference point is ascertained by means of a sweep of the fundamental modulation frequency over a defined frequency range.

5. The method according to claim 1, wherein the frequency of the wobble is higher than the frequency of the atmospheric fluctuations of the optical measurement path to the target.

6. A method for determining a distance to a retroreflective target, the method comprising:

generating a transmission radiation;

modulating the transmission radiation, wherein a fundamental modulation of the transmission radiation with a fundamental modulation frequency is provided by modulation means in the optical beam path of the transmission radiation;

emitting the modulated transmission radiation to the target; and detecting a measurement signal on the basis of part of the modulated transmission radiation returning from the target, referred to hereinafter as reception radiation, wherein detecting the measurement signal is performed such that information regarding the absolute distance to the target is attached to the measurement signal by means of at least one reference point of a frequency-dependent signal profile of the measurement signal, on the basis of a modulation phase of the reception radiation with respect to a set fundamental modulation, wherein the distance to the target is determined continuously, on the basis of a measurement process with defined steps corresponding to the temporal order below:

initially determining an initial distance to the target on the basis of:

an identification of a first and a second reference point of the signal profile (11) of the measurement signal, on the basis of a sweep of the fundamental modulation frequency over a defined frequency range, tracking of the first and second reference points, and deriving the initial distance on the basis of the identified first and second reference points, continuously determining a respective current distance to the target on the basis of a settable fundamental modulation frequency, on the basis of:

a tracking of the first reference point as long as the latter lies within a tolerance range defined within the defined frequency range, and a continuous derivation of the deviation of the frequency value of a set fundamental modulation frequency with respect to the first reference point, wherein the continuous derivation of the deviation is based on a wobble of the fundamental modulation frequency, said wobble being provided by a wobble generator, wherein the wobble represents a continuously rising or continuously falling frequency profile at least in sections, wherein the detected measurement signal is Fourier-transformed, and wherein the current distance is determined on the basis of the Fourier-transformed measurement signal, wherein for a set fundamental modulation frequency, the deviation of the frequency value of the fundamental modulation frequency with respect to the first reference point of the signal profile of the measurement signal is derived.

7. The method according to claim 6, wherein in the case where the first reference point leaves the tolerance range, on the basis of the last ascertainment of the deviation with respect to the first reference point within the tolerance range a further reference point within the tolerance range is selected, and the process of continuously determining the respective current distance to the target is continued, on the basis of:

a tracking of the further reference point as long as the latter lies within the tolerance range and a continuous derivation of the deviation of the frequency value of a set fundamental modulation frequency with respect to the further reference point.

8. The method according to claim 6, wherein the settable fundamental modulation frequency is adapted in the context of the measurement process, on the basis of:

individually derived deviations or a series of derived deviations of frequency values of previously set fundamental modulation frequencies with respect to the first reference point, or individually derived deviations or a series of derived deviations of frequency values of previously set fundamental modulation frequencies with respect to the further reference point.

9. A distance measuring device for determining a distance to a retroreflective target comprising:

a radiation source for generating a transmission radiation;

a modulation means in the optical beam path of the transmission radiation, which are configured for providing a fundamental modulation of the transmission radiation with a fundamental modulation frequency;

a wobble generator, which is configured for providing a wobble of the fundamental modulation frequency;

a transmission path for emitting part of the modulated transmission radiation to the target;

a reception path comprising a receiver configured for detecting a measurement signal on the basis of part of the modulated transmission radiation returning from the target, referred to hereinafter as reception radiation; and a computing unit configured for determining the distance as an absolute distance, wherein the distance measuring device is configured such that emitting the part of the modulated transmission radiation and detecting the measurement signal are carried out such that information regarding the absolute distance to the target is attached to the measurement signal by means of at least one reference point of a frequency-dependent signal profile of the measurement signal, on the basis of a modulation phase of the reception radiation with respect to a set fundamental modulation, wherein the wobble generator is configured for providing the wobble as a wobble having a continuously rising or continuously falling frequency profile at least in sections, wherein the computing unit is configured to transform the detected measurement signal by means of Fourier transformation, and wherein the computing unit is configured to carry out the determination of the distance on the basis of the Fourier-transformed measurement signal, wherein the computing unit, for the purpose of determining the distance for a set fundamental modulation frequency, derives the deviation of the frequency value of the fundamental modulation frequency with respect to a reference point of the signal profile of the measurement signal.

10. The distance measuring device according to claim 9, wherein the wobble generator is configured to provide the wobble as a periodic signal.

11. The distance measuring device according to claim 9, wherein the computing unit is configured such that the deviation is determined on the basis of:
   the amplitude and the imaginary part of the first harmonic of the Fourier decomposition of the measurement signal,
   the amplitude of the second harmonic of the Fourier decomposition of the measurement signal, and
   the excursion of the wobble.

12. The distance measuring device according to claim 9, wherein the distance measuring device is configured to carry out an ascertainment of the reference point by means of a sweep of the fundamental modulation frequency over a defined frequency range.

* * * * *